(«19») United States Patent [11] 4,387,830
Kitamura et al. [45] Jun. 14, 1983

[54] SIDE SEAM-COATED TINPLATE WELDED CAN

[75] Inventors: Yoichi Kitamura; Seishichi Kobayashi, both of Yokohama; Hiroshi Ueno, Yokosuka, all of Japan

[73] Assignee: Toyo Seikan Kaisha, Ltd., Tokyo, Japan

[21] Appl. No.: 271,238

[22] Filed: Jun. 5, 1981

[30] Foreign Application Priority Data

Jun. 12, 1980 [JP] Japan ................................. 55-78347

[51] Int. Cl.³ ............................................. B65D 7/34
[52] U.S. Cl. ..................... 220/456; 220/75; 220/457; 220/458
[58] Field of Search ................. 220/75, 454, 456, 457, 220/458, 468

[56] References Cited

U.S. PATENT DOCUMENTS

3,982,314  9/1976  Ariga et al. .......................... 220/456
4,054,227  10/1977  Saunders ............................. 220/456

Primary Examiner—Leon Gilden
Attorney, Agent, or Firm—Sherman & Shalloway

[57] ABSTRACT

Disclosed is a seam welded tinplate can having a side seam formed by welding, wherein the inner and outer surface portions of said side seam comprise an outermost layer formed of an oxide, which has a thickness of 50 to 400 Å, and an intermediate layer formed mainly of an iron-tin alloy layer, which has a thickness corresponding to 5 to 100% of the thickness of the total tin layer, and a resin or resin composition containing a polar group selected from the group consisting of carbonyl, hydroxyl, ether and epoxy groups at a concentration of 10 to 2000 millimoles per 100 g of the resin is coated on at least one of said inner and outer surface portions of said side seam.

8 Claims, 4 Drawing Figures

SIDE SEAM-COATED TINPLATE WELDED CAN

BACKGROUND OF THE INVENTION

1. Field of the Invention

The present invention relates to a seam-coated welded tinplate can, which is excellent in the adhesion of a protecting resin coating to the welded seam and in which the anti-corrosive action of the coated seam can be maintained durably even after processing such as flanging, double seaming, beading and necking.

2. Description of the Prior Art

A tin-plated steel sheet, that is, a tinplate sheet, is a material excellent in the corrosion resistance, the coating adhesion and the processability and has been used from old as a can blank. Tinplate cans are ordinarily formed according to a method comprising forming a can blank into a cylinder and bonding both the side edges of the cylinder by lap seam soldering, lock seam soldering or combination thereof while using a solder. According to this can forming process, a considerable area is necessary for the seam portion, and the process therefore includes a problem in connection with saving of the resource. Furthermore, in case of food cans, bad influences are brought about by soldering. Therefore, a can forming process not using a solder has been desired in the art.

Instead of soldered cans, seamless cans prepared by draw-ironing have been used in certain fields. However, deformation of the side wall by application of pressure is extreme in seamless cans, and hence, they cannot be conveniently used as vacuum cans, that is, cans of the type where canned contents are subjected to retort sterilization. As another instance that can be used instead of the soldered can, there is known a welded can formed by lap-bonding both the side edges of a can body by welding. The area of the lap seam portion in such welded can is much smaller than in the soldered can and this lap bonding method is advantageous in that a particular adhesive, for example, a solder, need not be used. However, known welded seam cans of tinplate are still insufficient in the appearance of the seam, the corrosion resistance and the coating adhesion.

In the manufacture of welded seam cans, lap portions prepared by forming a can blank into a cylinder are subjected to electric resistance welding by passing the lap portions through between a pair of upper and lower electrode rollers or passing the lap portions through between a pair of upper and lower electrode rollers via an electrode wire. However, when tinplate is used as the can blank, a tin plating layer is fused at the welding step and fused tin is transferred to the electrode member or is scattered in the form of fume, with the result that the protecting effect of the tin plating layer is lost and black or blue iron oxide is readily formed on the surface. A film of such iron oxide comes to have a thickness of 700 to 3000 Å.

This iron oxide is brittle and porous. Accordingly, if a protecting resin coating is applied to this iron oxide, adhesion is poor and dissolution of iron into the contents or corrosion of the seam is hardly prevented. Such defects of welded cans, that is, poor adhesion to the coating and poor corrosion resistance on the inner side seam, are made more serious when welded seams are subjected to processing necessary for the manufacture of cans, such as flanging, double seaming, necking or beading or when cans are subjected to a severe hydrothermal treatment such as sterilization after packing of the contents.

SUMMARY OF THE INVENTION

We found that in the manufacture if welded tinplate cans, when formation of an iron oxide layer is controlled on the inner and outer surfaces of the seam and the thickness of a layer of an oxide of iron and/or tin as the outermost layer is adjusted to 50 to 400 Å and when an iron-tin alloy layer having a thickness corresponding to 5 to 100% of the thickness of the total tin layer of a tinplate blank is formed between this oxide layer and the steel substrate and a resin or resin composition containing a polar group selected from carbonyl, hydroxyl, ether and epoxy groups at a concentration of 10 to 2000 millimoles per 100 g of the resin is coated through these layers, there can be obtained a seam-coated welded can which is excellent in the corrosion resistance of the seam and the adhesion of the coating to the seam and in which these excellent properties are not substantially impaired even if the welded can is subjected to processing such as mentioned above or retort sterilization.

In accordance with the present invention, there is provided a welded tinplate seam can having a side seam formed by welding, wherein the inner and outer surface portion of said side seam comprise an outermost layer formed of an oxide, which has a thickness of 50 to 400 Å, and an intermediate layer formed mainly of an iron-tin alloy layer, which has a thickness corresponding to 5 to 100% of the thickness of the total tin layer, and a resin or resin composition containing a polar group selected from the group consisting of carbonyl, hydroxyl, ether and epoxy groups at a concentration of 10 to 2000 millimoles per 100 g of the resin is coated on at least one of said inner and outer surface portions of said side seam.

DETAILED DESCRIPTION OF THE PREFERRED EMBODIMENTS

Figure 1:
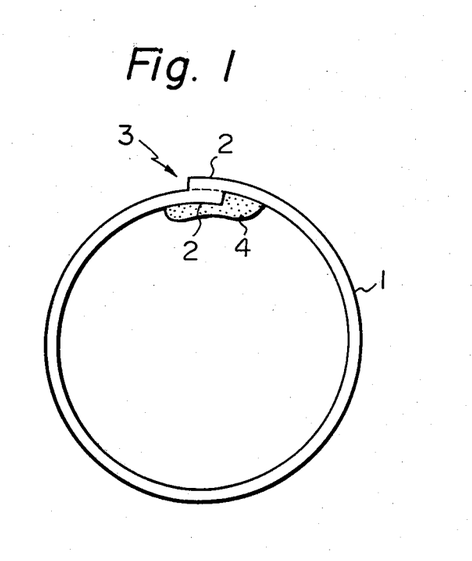
FIG. 1 is a sectional view illustrating the welded can according to the present invention.
Figure 2:
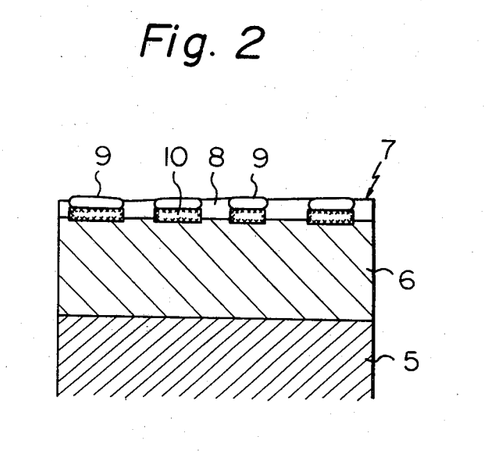
FIG. 2 is a sectional view illustrating in an enlarged manner the inner and outer surface portions of one example of the side seam of the welded can according to the present invention.

Referring to FIG. 1 illustrating one embodiment of the welded can according to the present invention, a tinplate can blank 1 is formed into a cylinder, and both the side edges 2 are lapped and welded according to specific welding means described hereinafter to form a side seam 3. A coating layer 4 of a resin or resin composition described hereinafter is formed on at least one surface of the side seam 3. Referring to FIG. 2 showing an instance of the inner and outer surfaces of the side seam 3 in the enlarged state, the welded can of the present invention has a steel substrate 5, an intermediate layer 6 of an iron-tin alloy formed on the steel substrate 5 and an oxide layer 7 formed on the intermediate layer 6. The welded can of the present invention is characterized in that the thickness of the oxide layer 7 is controlled to 50 to 400 Å and the thickness of the iron-tin alloy layer 6 corresponds to 5 to 100%, particularly 15 to 70%, of the thickness of the whole tin layer.

In an ordinary tinplate blank for use in the manufacture of cans, the thickness of the whole tin layer is 0.15 to 1.52 microns, and an iron-tin alloy layer is necessarily present between the steel substrate and metallic tin layer. The thickness of this iron-tin alloy layer is relatively small and corresponds to 5 to 30% of the thickness of the whole tin layer, though this thickness varies to some extent according to the tinplate manufacturing method. In the conventional welded cans, the metallic tin layer is substantially removed on the surface of the welded portion for the above-mentioned reasons and an iron oxide layer having a thickness of 700 to 3000 Å is formed instead of the removed metallic tin layer.

In contrast, in the welded can according to the present invention, the thickness of the iron-tin alloy layer is increased to 5 to 100% of the thickness of the whole tin layer while a certain tin layer is left, and the thickness of the oxide layer is controlled to the above-mentioned small value, that is, 50 to 400 Å. In the welded can according to the present invention, by virtue of the prominently increased thickness of the dense iron-tin alloy layer, the corrosion resistance of the bonded portion can be remarkably improved and also the processability of the surface of the welded portion and the adhesion of the resin coating can be prominently improved. Furthermore, since an oxide layer which is very thin and hence, has no bad influence on the processability is formed on this alloy layer, the adhesion of the coating is remarkably increased, with the result that excellent adhesion of the coating and a high corrosion resistance can be maintained in a coated can formed from the welded can of the present invention after severe processing or hydrothermal treatment such as retort sterilization.

As is illustrated in Examples given hereinafter, the thickness of the iron-tin alloy layer may be measured according to the fluorescent X-ray method. This thickness can also be measured by a scanning type electron microscope or an X-ray microanalyzer.

In the present invention, the composition of the iron-tin alloy layer 6 is not particularly critical. However, in many cases, the Fe/Sn atomic ratio is in the range of from 1/1 to 1/2. The oxide layer 7 is composed mainly of a continuous layer 8 of iron oxide, and a tin oxide layer 9 or a metallic tin layer 10 may be present in the form of islands or continuous layers in the oxide layer 7.

When the thickness of the iron-tin alloyllayer is too small and outside the above-mentioned range, a satisfactory corrosion resistance, satisfactory adhesion and processability of the coating cannot be obtained. If the thickness of the oxide layer is too large and outside the above-mentioned range, the foregoing characteristics are degraded, and the appearance characteristic and the coating adhesion are reduced.

In the welded can according to the present invention, the width of the side seam may be relatively small and is ordinarily in the range of 0.2 to 1.2 mm, though the width is changed to some extent according to the diameter of the can. Accordingly, the amount used of the can blank can be reduced in the present invention. This is one of advantages attained by the present invention. As the tinplate blank, there can be used a tin melt-plated steel sheet and a tin electro-plated steel sheet. As the tin electro-plated sheet, there may be used a reflow tinplate sheet and a non-reflow tinplate sheet. The amount deposited of tin in such tinplate is preferably 0.56 to 11.2 g/m$^2$, and the thickness of the tinplate sheet is preferably 0.15 to 0.50 mm.

In the manufacture of a welded seam can of tinplate according to the present invention, there are some requirements to be satisfied. Electric resistance welding of the side seam is accomplished by forming a can blank into a cylinder and passing the lap portion of the cylinder through a pair of electrode rollers or passing the lap portion through a pair of upper and lower electrode rollers via an electrode wire. It is important that this welding operation should be carried out in an inert atmosphere such as $N_2$, Ar, Ne, He or $H_2$ and this inert atmosphere should be maintained until the surface temperature of the welded portion is reduced to 550° C. The feature in which an inert atmosphere, that is, a non-oxidative atmosphere, is adopted as the welding atmosphere and also as the gradual cooling atmosphere results in attainment of two functional effects of reducing the thickness of the oxide layer and increasing the thickness of the alloy layer.

As the power source for the electric resistance welding, there can be used any of available power sources of alternating currents, direct currents and rectified currents, and the voltage and current are selected within the ranges customarily adopted in the manufacture of welded cans.

In order to form a welded seam defined in the present invention, it is important that while the outer surface temperature of the welded seam is reduced from the welding temperature (ordinarily in the range of from about 750° to about 1450° C.) to 550° C., the cooling rate should be adjusted to 100° to 900° C./sec. This cooling rate has influences on the thickness of the iron-tin alloy layer and the thickness of the oxide layer. More specifically, if the cooling rate is higher than 900° C./sec, the thickness of the alloy layer is apt to be smaller than the lower limit defined in the present invention and if the cooling rate is lower than 100° C./sec, the thickness of the oxide layer is apt to be larger than the upper limit defined in the present invention. If the cooling rate is controlled within the above-mentioned range, it is possible to impart a good thickness combination capable of providing most preferred characteristics to the oxide layer and the iron-tin alloy layer.

Another important feature of the present invention is that a coating layer of a resin or resinous composition containing a polar group selected from the group consisting of carbonyl ($>C=O$), hydroxyl, ether and epoxy groups at a concentration of 10 to 2000 millimoles, especially 20 to 1600 millimoles, per 100 g of the polymer is formed as the coating layer on the welded seam having the above-mentioned structure.

More specifically, a resin or resin composition containing the above-mentioned polar group at the above-mentioned concentration adheres a very tightly to the tinplate substrate through the above-mentioned oxide layer and iron-tin alloy layer to provide a coated seam structure excellent in the corrosion resistance, processability and adhesion. When the polar group concentration is below the above-mentioned range, the adhesion, especially the adhesion after retort sterilization, is often reduced, and if the polar group concentration exceeds the above range, the corrosion resistance becomes insufficient.

The carbonyl group ($>C=O$) present as the polar group in the protecting resin coating of the present invention may be any of carbonyl groups derived from carboxylic acids, carboxylic acid salts, carboxylic acid esters, carboxylic acid amides, carbonic acid esters and urea or urethane linkages. The above-mentioned polar groups may be contained in the molecule chains of the resins in the form of a pendant group on the molecule chain or a terminal group.

As such resin, there can be mentioned thermoplastic polymers, thermosetting polymers and combinations thereof. For example, thermoplastic polymers can be obtained by including a monomer having a polar group such as mentioned above into the main polymer chain by polymerization or copolymerization or by coupling such monomer to a thermoplastic polymer by a grafting or terminal treatment. Furthermore, in case of a hydrocarbon type polymer such as an olefin resin, a thermoplastic resin having the above-mentioned polar group at the above-mentioned concentration can be formed by subjecting this resin to an oxidizing treatment. It is preferred that the softening point of the thermoplastic polymer be 50° to 300° C. as measured by the ring and ball method.

Appropriate examples of such thermoplastic polymers are described below, though thermoplastic polymers that can be used in the present invention are not limited to those described below.

(a) Polyesters comprising recurring units represented by the following general formula:

(1)

or (2)

wherein $R_1$ stands for an alkylene group having 2 to 6 carbon atoms and $R_2$ stands for an alkylene or arylene group having 2 to 24 carbon atoms.

For example, there can be mentioned polyethylene adipate, polyethylene sebacate, polyethylene terephthalate, polytetramethylene isophthalate, polyethylene terephthalate/isophthalate, polytetramethylene terephthalate, polyethylene/tetramethylene terephthalate and polyethylene/hydroxybenzoate.

(b) Homopolymers or copolymers of monomers represented by the following formula:

(3)

wherein $R_3$ stands for a hydrogen atom or a lower alkyl group and $R_4$ stands for an amino group, a hydroxyl group or an alkoxy, hydroxyalkylene-oxy or aminoalkylene-oxy group having 1 to 12 carbon atoms, and copolymers of monomers of the formula (3) with olefins or other vinyl monomers, and acryl-modified polyolefins.

For example, there can be mentioned polyacrylic acid esters, polymethacrylic acid esters, ethylene/acrylic acid ester copolymers, acrylic acid ester/acrylic acid copolymers, ethylene/acrylic acid ester/acrylic acid copolymers, ethylene/acrylic acid copolymers, styrene/methacrylic acid ester/acrylic acid copolymers, acrylic acid ester/vinyl chloride copolymers, acrylic acid ester-grafted polyethylene, methacrylic acid ester/vinyl chloride copolymers, styrene/methacrylic acid ester/butadiene copolymers, methacrylic acid ester/acrylonitrile copolymers, propyl γ-hydroxymethacrylate/vinyl chloride copolymers and acrylamide/vinylidene chloride/vinyl chloride copolymers.

(c) Copolymers of vinyl esters represented by the following general formula:

(4)

wherein $R_5$ stands for a hydrogen atom, an alkyl group or a phenyl group, with olefins or other vinyl monomers, and partially saponified products thereof.

For example, there can be mentioned partially saponified ethylene/vinyl acetate copolymers, partially saponified and partially acetalized polyvinyl chloride, ethylene/vinyl propionate copolymers, ethylene/vinyl acetate copolymers, acrylic acid ester/vinyl acetate copolymers and vinyl chloride/vinyl acetate copolymers.

(d) Ionomers (ion-crosslinked olefine copolymers), that is, resins obtained by neutralizing copolymers of olefins with unsaturated carboxylic acids, optionally with other vinyl monomers, with an alkali metal, an alkaline earth metal or an organic base.

For example, there can be mentioned Surlyns manufactured and marketed by Du Pont Co., U.S.A.

(e) Copolymers of maleic anhydride with other vinyl monomers and maleic anhydride-modified polyolefins.

For example, there can be mentioned maleic anhydride/styrene copolymers, maleic anhydride-modified polypropylene and maleic anhydride-modified polyethylene.

(f) Polycarbonates having recurring units represented by the following formula:

(5)

wherein $R_6$ represents a hydrocarbon group having 8 to 15 carbon atoms.

For example, there can be mentioned poly-p-xylene glycol biscarbonate, poly-dioxydiphenylmethane carbonate, poly-dioxydiphenylethane carbonate, poly-dioxydiphenyl-2,2-propane carbonate and poly-dioxydiphenyl-1,1-ethane carbonate.

(g) Polyamides having recurring units represented by the following general formula:

(6)

or

(7)

wherein n is a number of from 3 to 13 and m is a number of from 4 to 11.

For Example, there can be mentioned poly-ω-aminocaproic acid, poly-ω-aminoheptanoic acid, poly- ω-aminocaprylic acid, poly-ω-aminopelargonic acid, poly-ω-aminodecanoic acid, poly-ω-aminoundecanoic acid, poly-ω-aminotridecanoic acid, polyhexamethylene adipamide, polyhexamethylene sebacamide, polyhexamethylene dodecamide, polyhexamethylene tridecamide, polydecamethylene adipamide, polydecamethylene sebacamide, polydecamethylene dodecamide, polydecamethylene tridecamide, polydodecamethylene adipamide, polydodecamethylene sebacamide, polydodecamethylene dodecamide, polydodecamethylene tridecamide, polytridecamethylene adipamide, polytridecamethylene sebacamide, polytridecamethylene dodecamide, polytridecamethylene tridecamide, polyhexamethylene azelamide, polydodecamethylene azelamide and polytridecamethylene azelamide.

(h) Polyureas having recurring units represented by the following general formula:

(8)

or (9)

wherein $R_7$ and $R_8$ stands for an alkylene group having 1 to 13 carbon atoms.

For example, there can be mentioned polyhexamethylene-urea, polyheptamethylene-urea, polyundecamethylene-urea and polynonamethylene-urea.

(i) Polyurethanes and polyureaurethanes represented by the following general formula:

(10)

or

(11)

wherein $R_9$ stands for an alkylene group having 3 to 24 carbon atoms or a polyether or polyester residue having 3 to 24 carbon atoms, $R_{10}$ stands for an alkylene or arylene group having 3 to 24 carbon atoms, $R_{11}$ stands for an alkylene or arylene group having 1 to 13 carbon atoms, and k is a number of 0 or 1.

For example, there can be mentioned polytetramethylenehexamethylene-urea, polyhexamethylene-tetramethylene-urea, and polyureaurethanes formed by chain-extending isocyanate-terminated polyesters or polyethers with a diamine or water.

(j) Resin particles obtained by oxidizing particles of polyethylene, polypropylene or a crystalline ethylene-/propylene copolymer with oxygen, ozone or other oxidant.

(k) Copolymers of a monomer represented by the following formula:

(12)

wherein $R_3$ stands for a hydrogen atom or a lower alkyl group, and Y stands for a group —O—, —CH$_2$O— or —COO—, with an olefin or other vinyl monomer, and polyolefins modified with the above monomer.

For example, there can be mentioned glycidyl methacrylate/vinyl chloride/vinyl acetate copolymers, glycidyl vinyl ether/vinyl chloride copolymers and glycidyl acrylate-modified polypropylene.

As the thermosetting resin having the above-mentioned polar group, there can be mentioned, for example, phenol-formaldehyde resins, furan-formaldehyde resins, xylene-formaldehyde resins, ketone-formaldehyde resins, urea-formaldehyde resins, melamine-formaldehyde resins, alkyd resins, unsaturated polyester resins, epoxy resins, bismaleimide resins, triallyl cyanurate resins, thermosetting acrylic resins, silicone resins and oleoresins.

The concentration of the polar group in the resin used as the coating layer in the present invention has considerably close relations to the adhesion to the seam, the barrier property to corrosive components and the processability. For example, a polyamide or polyester is excellent in the adhesion to the seam and has a relatively large barrier property to corrosive components, because the polyamide or polyester has amide or ester recurring units in the molecule chain. Furthermore, the polyamide or polyester is excellent in the processability because it is a thermoplastic polymer. On the other hand, a vinyl chloride resin or acrylonitrile resin has a large barrier property but is poor in the adhesion to the welded seam because such resin has a chlorine atom or a nitrile group side chain in the recurring units of the molecule chain. However, if a monomer containing a polar group such as a carbonyl, hydroxy, ether or epoxy group is introduced into such resin, the adhesion to the welded seam can be improved and simultaneously, the processability can highly be improved. A polyolefin resin is similarly poor in the adhesion to the welded seam, though it is excellent in the moisture resistance and processability. Also in case of the polyolefin resin, the adhesion can be improved by introduction of a monomer component having the above-mentioned polar group.

From the viewpoint of the barrier property to corrosive components, it is preferred that a thermoplastic resin or thermosetting resin, especially a thermosetting resin, having a density of at least 1.0 g/cc, particularly 1.1 to 1.35 g/cc, be used as the resin to be coated on the welded seam.

A protecting resin most suitable for attaining the objects of the present invention is a composition comprising an epoxy resin and other resin.

As the epoxy resin component, there is used an epoxy compound containing at least one oxirane ring in the molecule, especially a bisepoxide, and it is preferred that the epoxy equivalent of the epoxy resin component used be 450 to 5500 and particularly 1000 to 5000.

An aromatic epoxy resin derived from a bisphenol and an epihalohydrin is especially preferred as the epoxy resin component.

As the other resin component (curing agent component), there can be used resins having a functional group capable of reacting with an epoxy resin, such as a hydroxyl, carboxyl, acid anhydride, amino or amido group, on the molecule chain and having preferable a film-forming property. These resins may be used singly or in the form of a mixture of two or more of them. Preferred examples of the curing agent resin components are described below, though curing agent resin components that can be used in the present invention are not limited to those described below.

(a) Hydroxyl group-containing resins such as resol type phenol-aldehyde resins, xylene-aldehyde resins, urea-aldehyde resins, melamine-aldehyde resins, partially or completely saponified vinyl chloride/vinyl acetate copolymers, and hydroxyalkyl ester type acrylic resins.

(b) Acid- or acid anhydride-containing resins such as vinyl chloride/maleic anhydride copolymers, vinyl chloride/vinyl acetate/maleic anhydride copolymers, and carboxylic acid-containing acrylic resins.

(c) Amino group- or amido group-containing resins such as dimer acid-modified polyamide resins and aminoalkyl ester type acrylic resins.

A hydroxyl group-containing or acid- or acid anhydride-containing resin is preferably used as the curing agent type resin component for attaining the objects of the present invention.

It is preferred that the epoxy resin component and the curing agent resin component be used at a weight ratio of from 95/5 to 1/99, especially from 90/10 to 5/95. When the amount of the epoxy resin component is below this range, the adhesion to the welded seam is often reduced, and if the amount of the epoxy resin component exceeds the above range, the corrosion resistance is often reduced.

If only the thermosetting resin used in the present invention contains the above-mentioned polar group at the above-mentioned concentration, satisfactory results can be obtained with respect to the adhesion to the seam and the barrier property. However, from the viewpoint of the processability, it is preferred that the thermosetting resin should have a methylethyl ketone (MEK) swelling elasticity of from $1 \times 10^4$ to $1 \times 10^8$ dyne/cm$^2$, especially from $5 \times 10^4$ to $5 \times 10^7$ dyne/cm$^2$. The MEK swelling elasticity referred to herein is a value determined according to the following method.

A sample having a size of 5 cm×5 cm is cut from a seam of a body portion of a sample can, and the steel substrate is dissolved in a 5% aqueous solution of nitric acid to recover the seam coating in the form of a film. This film is allowed to stand in a gas phase saturated with MEK at 30° C. for 24 hours to produce an equilibrium swollen state, and the thickness of the film is measured in this state and the sectional area (S) is determined. The film is pulled at a pulling speed of 10 mm/min in a gas phase saturated with MEK at 30° C. by using a tensile tester to botain a stress-strain curve. From this curve, the load (W) at a strain of 5% is obtained, and the swelling elasticity (E) of the coating is calculated according to the following formula:

$$E = 20W/S \text{(dyne/cm}^2\text{)}$$

This MEK swelling elasticity (E) has a close relation to the crosslinking density of the thermosetting resin, and the higher is the crosslinking density, the larger is the value of the MEK swelling elasticity (E). If the value E exceeds the above-mentioned range, the coating is poor in the processability and cracks are readily formed in the coating at the above-mentioned processing such as necking, flanging and double seaming, and corrosion of the seam portion or dissolution of the metal from this portion readily takes place. If the value E is below the above-mentioned range, reduction of the adhesion of the coating to the seam, especially after retort sterilization, is often observed.

Control of the MEK swelling elasticity (E) within the above-mentioned range can be accomplished by (1) adjustment of the functionality of resin-constituting components, (2) adjustment of resin-curing conditions or (3) combination of the adjustments (2) and (3). For example, in case of the adjustment (1), the ratio of the trifunctional or higher functional components to the bifunctional components is adjusted, and the value E can thus be maintained within the range of from $1 \times 10^4$ to $1 \times 10^8$ dyne/cm$^2$. More specifically, in case of a phenolic resin, by adjusting the mixing ratio of a trifunctional or higher functional phenol to a bifunctional phenol such as a p-alkylphenol, the value E can be changed within a broad range. Similarly, by adjusting the mole number of the aldehyde bonded to the phenol ring within a range of from 1 to 3, the value E can be changed within a broad range. This latter adjustment can similarly be adopted in case of urea-aldehyde resins, melamine-aldehyde resins and xylene-aldehyde resins. Furthermore, in case of an epoxy resin, the value E can be adjusted by appropriately selecting the functionality of the curing agent used or the epoxy equivalent of the epoxy resin. Moreover, in case of an unsaturated polyester or unsaturated polyester-urethane, the value E can easily be adjusted by controlling the concentration or number of ethylenically unsaturated units in the polymer chain.

The relation between the functionality and MEK swelling elasticity in respective resins can easily be determined by those skilled in the art by conducting preliminary experiments. Furthermore, those skilled in the art can easily determine the relation between the resin-curing conditions and the MEK swelling elasticity (E) by simple experiments.

In accordance with one preferred embodiment of the present invention, the above-mentioned thermoplastic resin and thermosetting resin are used at a weight ratio of from 1/99 to 99/1, especially from 10/90 to 90/10.

These resins may be applied to the welded seam in an optional form, for example, a powder, a film, a melt, a solution, a dispersion, an organosol, a plastisol or the like. Of course, known additives such as ultraviolet absorbents, stabilizers, lubricants, antioxidants, pigments, dyes and antistatic agents may be incorporated into these resins according to known recipes.

Application of the resin or resinous composition to the seam can be accomplished by known methods selected according to the form of the resin or resinous composition, for example, fluidized dip coating, electrostatic powder coating, flame spraying, extrusion coating, film fusion bonding by induction heating, spray coating, roller coating, dip coating, brush coating and electrodeposition coating.

The thickness of the coating layer is selected within a range of from 2 to 150 μm, especially from 5 to 100 μm, so that a sufficient corrosion resistance can be obtained according to the kind of the resin used. The coating layer may be a single layer or may comprise a plurality of different layers. For example, there may be adopted a method in which a thin layer of a thermosetting resin is first formed and a thick layer of a thermoplastic resin is formed thereon.

The side seam-coated welded can of the present invention can be used in various fields as a vacuum can which is subjected to retort sterilization of the content, an inner pressure can in which a carbonated drink or the like is packed or an aerosol can.

The present invention will now be described in detail with reference to the following Examples that by no means limit the scope of the invention.

In the Examples, analysis of the metal surface of the welded zone, the measurement of the polar group concentration and properties of the coating and the evaluation of properties of the obtained can were conducted according to the following methods.

Figure 3:
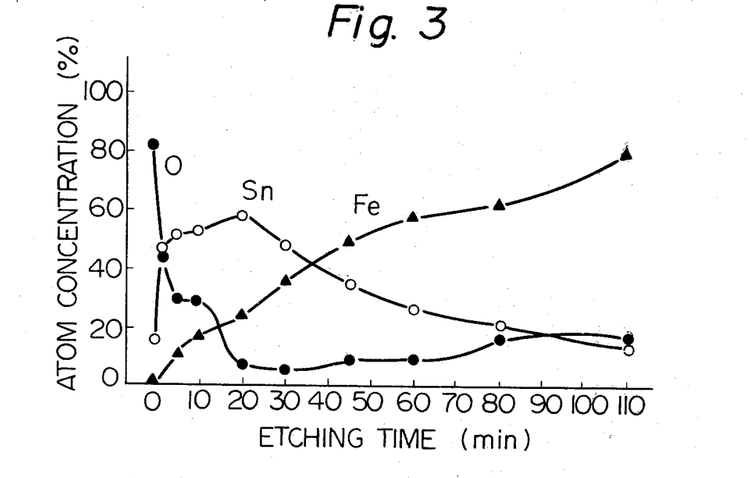
FIGS. 3 and 4 are curves showing the results of surface atom analysis of the welded seam of the welded can by electron spectroscopy for chemical analysis and the relations between the etching time and the atom concentration, which were obtained in Example 2 and Comparative Example 2.
Figure 4:
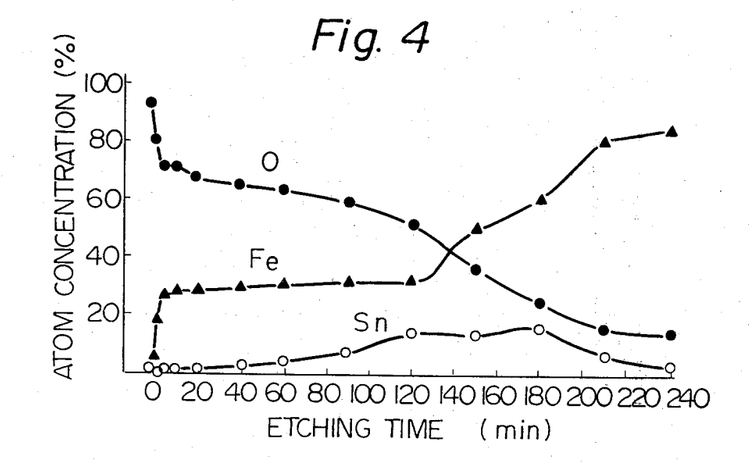

(1) Thickness of Surface Oxide Layer and Alloy Layer in Welded Zone:

The coated side seam portion was dipped in cyclohexanon at 150° C. for 5 hours to sufficiently swell the coating formed on the welded seam, and the coating was removed by absorbent cotton. Only the welded seam (welded lap portion) was cut out, and the cut pieces were bonded by an adhesive tape to form a sample having a size of 8 mm×8 mm. The surface of the sample was etched under spattering conditions of 1 KV and 20 µA/cm$^2$ in an Ar gas atmosphere ($8 \times 10^{-5}$ Torr), and the atom concentration ratio of Sn, O and Fe was determined. Oxygen (O) in the oxide layer was etched at a rate of 15 Å/min, and while etching is conducted, the atom concentration ratio of oxygen was constant at a level of 10 to 20%. Accordingly, the portion where the atom concentration ratio of oxygen was higher than 20% was regarded as the oxide layer. The etching rates of iron and tin were 15 Å/min and 8 Å/min, respectively. The relations between the etching time and the atom concentration, obtained in Example 2 and Comparative Example 2, are shown in FIGS. 3 and 4, respectively.

(2) Polar Group Concentration of Seam-Coating Layer:

A sample piece having a size of 10 mm×10 mm was cut from the seam of a body portion of a sample can and the outer surface coating was scraped off. The steel plate substrate was dissolved in a 5% aqueous solution of nitric acid and the seam coating was obtained in the form of a film.

The film was sufficiently washed with water and vacuum-dried at 100° C. overnight. An infrared absorption spectrum of the film was obtained, and characteristic absorption peaks of the carbonyl, hydroxyl, ether and epoxy groups were read from the obtained spectrum. The concentrations of the respective polar groups (millimoles per 100 g of the resin) were determined from these read values by using calibration curves of the polar group concentrations and the characteristic absorption peaks, which had been formed in advance.

(3) Adhesion of Side Seam-Coating Film, Processability and Adhesion after Processing:

(a) Adhesion:

A coated welded portion was cut out, and the coating film was cut by a razor to form 100 square cuts having an area of 1 mm×1 mm and an adhesive tape was applied thereto. Then, the adhesive tape was peeled off and the number of square peeled off together with the adhesive tape was counted. With respect to each sample, 5 test pieces were tested and an average value of the numbers of the peeled square cuts was calculated and used for evaluation of the adhesion.

(b) Processability:

A test piece having a width of 40 mm and a length of 60 mm was cut out from coated welded portion. The flexural strength test was carried out according to the bending resistance test method of JIS K-5400, 6-16.

From the test piece which had been subjected to the flexural strength test, a portion having a width of 3 mm with the side seam being as the center and a length of 6 mm in parallel to the side seam with the bent top end being as the center was removed, and the remaining portion was sealed by an adhesive vinyl tape and was dipped in a 20% aqueous solution of copper sulfate (containing about 5% of hydrochloric acid) at 25° C. for 5 minutes, and the number of spots of copper deposited in the vicinity of the seam was counted. This test was conducted on 5 test pieces with respect to each sample and an average value was calculated. The obtained results were evaluated as follows:

◎ : no deposition spot
○ : 1 to 5 deposition spots
△: 6 to 15 deposition spots
X: linear deposition of copper (c) Adhesion after Processing:

A can body including a coated welded portion was subjected to necking processing and flanging processing, and it was checked whether or not the coating layer of the processed portion was peeled.

(4) Evaluation of Actually Packed Cans:

(a) Amount of Formed Hydrogen:

At the time of opening, the gas in the can was collected and the amount of hydrogen was determined according to gas chromatography. Ten cans were tested with respect to one sample, and the arithmetic mean value was calculated. When swollen cans were formed, this fact was indicated.

(b) Amount of Iron Dissolved Out:

Cans packed with an apple drink or consomme were tested. After opening, all the content was reduced to ashes. The ashes were dissolved in hydrochloric acid and the supernatant was subjected to the atomic absorption spectroscopy to determine the amount of iron in the content. Optionally chosen 10 cans were tested with one sample, and the arithmetic mean value was calculated.

(c) Perforation and State of Welded Seam Portion on Inner Face of Can:

Packed cans were stored at 37° C. for 1 year and leakage of the content (liquid) was checked by the naked eye observation. Cans where leakage of the content was observed were picked up and the portions near the side seams were observed by a microscope after opening. Cans having piercing holes were designated as "perforated cans", and the ratio of the number of the perforated cans to the total number of the tested cans was calculated. After opening, the corrosion state of the portion near the side seam was checked by the naked eye observation or microscopic observation. With respect to one sample, 100 cans were subjected to the storage test, and the corrosion state was examined on optionally chosen 50 cans.

EXAMPLE 1

An epoxy-phenolic paint (1:1 mixture of an epoxy resin and a phenolic resin) was margin-coated on a tinplate sheet having a thickness of 0.21 mm, a hardness of T-4 and a plated amount of tin of 50 lb/B.B. (tin layer thickness = 1.23 μm) except a portion to be formed into a side seam of a can body, so that the thickness of the coating after baking was 5 μm on the inner surface and 3 μm on the outer surface, and the coated paint was baked and cured for 10 minutes in a hot air drying furnace maintained at 200° C. The coated tinplate sheet was cut into a can body blank for a can of nominal size No. 7 (blank length = 206.4 mm, blank height = 104.5 mm). The blank was formed into a cylinder by a roll former, and by using a commercially available seam welding machine equipped with an inert gas supply nozzle, the laps were welded under welding conditions described below to obtain a can body of a nominal size of No. 7 having a nominal diameter of 211 and an inner volume of 318.2 ml.

Welding Conditions

Electrode: Cu wire
Lap width: 0.4 mm
Welding speed: 30 m/min
Electrode pressure: 40 Kg
Voltage on primary side: 200 V
Inert gas ($N_2$) feed rate: 20 l/min
Surface cooling rate of welded portion to 550° C.: 600° C./sec The lap portion was taken out from the so obtained welded can body, and the lap portion was divided into 20 equal parts and the thickness of the iron oxide layer and the alloy layer was measured with respect to each part according to the method described hereinbefore to obtain the results shown in Table 1.

Then, an epoxy-urea paint (having a solid content of 25% and obtained by dissolving 80 parts of an epoxy resin having an average molecular weight of 2900, which was obtained by condensing bisphenol A with epichlorohydrin, and 20 parts of a butyletherified urea-formaldehyde resin in a mixed solvent comprising a ketone, an ester, an alcohol and a hydrocarbon) was spray-coated on the seam portions of the inner and outer surfaces of the obtained can body along a width of about 10 mm by using an air spray gun while maintaining the paint temperature at 30° to 40° C. during the spraying operation, so that the thickness of the coating after drying was 20 μm. Then, the baking operation was carried out for 3 minutes in a hot air drying furnace maintained at 220° C. to obtain a can body having a coated seam portion. The concentrations of the polar groups in the seam-coating film were measured according to the method described hereinbefore. It was found that the concentrations of the carbonyl, hydroxyl, ether and epoxy groups were 220, 200, 600 and 20 millimoles/100 g of the resin, respectively, and the total concentration of the polar groups was 1040 millimoles/100 g of the resin. The density of the seam-coating film was 1.20 g/cc.

EXAMPLE 2

A can body blank prepared from the same tinplate sheet as used in Example 1 in the same manner as described in Example 1 was welded under welding conditions described below to obtain a can body of a nominal size of No. 7.

Welding Conditions

Electrode: Cu wire
Lap width: 0.4 mm
Welding speed: 30 m/min
Electrode pressure: 40 Kg
Voltage on primary side: 205 V
Inert gas ($N_2$) feed rate: 5 l/min
Surface cooling rate of welded portion to 550° C.: 350° C./sec The thickness of the iron oxide layer and alloy layer of the welded portion of the obtained can body was measured.

Then, the same epoxy-urea paint as used in Example 1 was coated and baked on the so obtained can body under the same conditions as described in Example 1, to obtain a can body having a coated seam portion.

EXAMPLE 3

A can body blank prepared from the same tinplate sheet as used in Example 1 in the same manner as described in Example 1 was welded under the welding conditions described below to obtain a can body having a nominal size of No. 7.

Welding Conditions

Electrode: Cu wire
Lap width: 0.4 mm
Welding speed: 30 m/min
Electrode pressure: 40 Kg
Primary side voltage: 205 V
Inert gas ($N_2$) feed rate: 2 l/min
Surface cooling rate of welded portion to 550° C.: 200° C./min The thickness of the iron oxide layer and alloy layer of the welded portion of the obtained can body was measured.

The same epoxy-urea paint as used in Example 1 was coated and baked on the obtained can body under the same conditions as described in Example 1 to obtain a can body having a coated seam portion.

Comparative Example 1

The same tinplate can body blank as described in Example 1 was welded under the same conditions as adopted in Example 1 except that an inert gas of $N_2$ was blown to a portion to be welded at a feed rate of 0.2 l/min, to obtain a can body of a nominal size of No. 7. The thickness of the iron oxide layer and alloy layer of the welded portion of the obtain can body was measured. Then, the same epoxy-urea paint as used in Example 1 was coated and baked on the obtained can body under the same conditions as adopted in Example 1 to obtain a comparative can body having a coated seam portion.

Comparative Example 2

The same tinplate can body blank was welded under the same conditions as adopted in Example 1 without using an inert gas to obtain a can body of a nominal size of No. 7. The surface cooling speed of the welded portion to 550° C. was 150° C./sec. The thickness of the iron oxide layer and alloy layer in the welded portion of the can body was measured.

The same epoxy-urea paint as used in Example 1 was coated and baked under the same conditions as adopted in Example 1 to obtain a comparative seam-coated can body.

Welded portions were cut from the seam-coated can bodies obtained in Examples 1, 2 and 3 and Comparative Examples 1 and 2 and the adhesion and processability of the coating layers were examined. The can bodies were subjected to beading, necking and flanging and tinplate lids for a can having a nominal diameter of 211 (65.3 mm) and also having both the inner and outer surfaces coated with an epoxy-phenolic paint were double-seamed to the can bodies. The obtained empty cans were packed with consomme soup or tomato sauce, and tinplate lids having the same size and coating as described above were double-seamed to the packed can bodies. These packed cans were heat-sterilized at 118° C. for 90 minutes and stored for 1 year at 37° C. Ten cans were optionally chosen from 100 cans with respect to each sample and the amount of dissolved-out iron and the amount of hydrogen were examined in these ten cans. Furthermore, 50 cans optionally chosen were opened and the corrosion state of the seam portion of each can body was examined. The obtained results are shown in Table 1.

dibasic acid component comprising 50 mole % of terephthalic acid and 50 mole % of isophthalic acid and a glycol component comprising 50 mole % of ethylene glycol and 50 mole % of neopentyl glycol in a mixed solvent comprising a ketone, an alcohol, an ester and a hydrocarbon, was spray-coated on the inner surface welded portion of the above can body along a width of 10 mm by using an airless spray gun, so that the thickness of the coating after drying was 25 $\mu$m. The coating was baked for 2 minutes in a hot air drying furnace maintained at 200° C. to obtain a can body having a coated seam. The concentrations of the polar groups in the coating layer and the density of the coating film were measured to obtain results shown in Table 2.

EXAMPLE 5

A welded portion of a welded can body obtained in

TABLE 1

| | Results of Analysis of Metal Surface Layer | | | | |
|---|---|---|---|---|---|
| Example No. | Thickness (A) of Surface Oxide Layer | Ratio (%) of Alloy Layer Thickness to Plating Thickness | Adhesion | Processability | State of Necking-Processed Portion |
| 1 | 60–70 | 7–10 | 0/100 | ◎ | no change |
| 2 | 150–170 | 60–69 | 0/100 | ◎ | no change |
| 3 | 350–380 | 90–95 | 2/100 | ○ | no change |
| Comparative Example 1 | 700–800 | 3–6 | 30/100 | △ | peeling |
| Comparative Example 2 | 1400–1600 | 15–23 | 80/100 | X | peeling |

| | Actually Packed Can Test | | | | | |
|---|---|---|---|---|---|---|
| | Consomme Soup | | | Tomato Sauce | | |
| Example No. | Amount (ppm) of Iron Dissolved Out | State of Seam | Number of Perforated Cans | Amount (ppm) of H$_2$ Formed | State of Seam | Number of Perforated Cans |
| 1 | 0.3 | no change | 0 | 0.17 | no changed | 0 |
| 2 | 0.4 | no change | 0 | 0.16 | no change | 0 |
| 3 | 0.4 | no change | 0 | 0.19 | no change | 0 |
| Comparative Example 1 | 5.2 | blister | 3 | 2.1 | blister | 2 |
| Comparative Example 2 | 12.2 | extreme blister | 6 | swollen cans | extreme blister | 15 |

EXAMPLE 4

An epoxy-urea paint (80/20 mixture of an epoxy resin and a urea-formaldehyde resin) was margin-coated on a tinplate sheet having a thickness of 0.21 mm, a hardness of T-4 and a plated tin amount of 25 lb/B.B. (tin layer thickness=0.60 $\mu$m) except a portion to be formed into a seam of a can body so that the thickness of the coating after baking was 5 $\mu$m on the inner surface side and 3 $\mu$m on the outer surface side. The coating was baked and cured for 10 minutes in a hot air drying furnace maintained at 200° C. The coated plate was cut into a can body blank having a nominal size of No. 7 (blank length=206.4 mm, blank height=104.5 mm). The welding operation was carried out under the same conditions as adopted in Example 2 to obtain a can body having a nominal diameter of 211, a nominal size of No. 7 and an inner capacity of 318.2 ml. The lap portion of the obtained can body was cut out and the thickness of the iron oxide layer and alloy layer. It was found that the thickness of the surface oxide layer was 160 to 180 Å, and the ratio of the alloy layer thickness to the plating thickness was 60 to 66%.

A paint having a solid content of 20%, which was obtained by dissolving a copolyester derived from a the same manner as described in Example 4 was heated at 240° C. and a film of a nylon 12 polyamide (having a softening point of 178° C.) having a thickness of 100 $\mu$m and a width of 1 cm was press-bonded to the inner surface of the welded portion. The concentrations of the polar groups in the so obtained coating layer and the density of the coating film were measured to obtain results shown in Table 2.

EXAMPLE 6

A powdery paint of a maleic acid-modified polypropylene (softening point=165° C.) having an average particle size of 20 $\mu$m was coated on the inner surface of a welded portion of a welded can body obtained in the same manner as described in Example 4 according to the electrostatic coating method, and the coating was baked for 3 minutes in a hot air drying furnace maintained at 200° C. to obtain a can body having a seam coating having a width of 12 mm and a thickness of 50 $\mu$m. The concentrations of the polar groups in the coating and the density of the coating film were measured to obtain results shown in Table 2.

EXAMPLE 7

A paint having a solid content of 20%, which was formed by dissolving a vinyl chloride/vinyl acetate/vinyl alcohol copolymer (softening point = 120° C.) in a mixed solvent of a ketone, an alcohol, an ester and a hydrocarbon, was spray-coated on the inner surface of a welded portion of a welded can body obtained in the same manner as described in Example 4 along a width of 10 mm by using an air spray gun, so that the thickness of the coating after drying was 20 μm. The coating was baked in a hot air drying furnace maintained at 180° C. for 2 minutes to obtain a can body having a coated seam. The concentrations of the polar groups in the coating and the density of the coating film were measured to obtain results shown in Table 2.

EXAMPLE 8

A paint having a solid content of 10%, which was formed by dissolving a polyvinyl butyral resin (degree of butyralization of 60% and softening point of 150° C.) in a mixed solvent of an alcohol, a ketone, an ester and a hydrocarbon, was spray-coated on the inner surface of a welded portion of a can body obtained in the same manner as described in Example 4 along a width of 10 mm by using an air spray gun, so that the thickness of the coating after drying was 20 μm. The coating was baked for 3 minutes in a hot air drying furnace maintained at 180° C. to obtain a can body having a coated seam. The concentrations of the polar groups in the coating and the density of the coating film were measured to obtain results shown in Table 2.

EXAMPLE 9

A paint having a solid content of 40%, which comprised 90 parts of an epoxy ester resin derived from 70 parts of a bisphenol A type epoxy resin having an average molecular weight of 1400 and 30 parts of dehydrated castor oil fatty acid and 10 parts of a butylated melamine-formaldehyde resin, was roll-coated on the inner surface of a welded portion of a welded can obtained in the same manner as described in Example 4 along a width of 8 mm, so that the thickness of the coating after drying was 20 μm. The coating was baked for 3 minutes in a hot air drying furnace maintained at 180° C. to obtain a can body having a coated seam. The concentrations of the polar groups in the coating and the density of the coating film were measured to obtain results shown in Table 2.

Furthermore, the MEK equilibrium swelling elasticity (E) was measured according to the above-mentioned method. The value of $4.2 \times 10^5$ dyne/cm$^2$ was obtained.

EXAMPLE 10

A paint having a solid content of 40%, which comprised 80 parts of an acrylic resin obtained by solution polymerization of 70 mole % of methyl methacrylate, 25 mole % of β-hydroxyethyl acrylate and 5 mole % of acrylic acid and 20 parts of a butylated benzoguanamine-formaldehyde resin, was roll-coated on the inner surface of a welded portion of a welded can body obtained in the same manner as described in Example 4 along a width of 8 mm, so that the thickness of the coating after drying was 30 μm. The coating was baked for 3 minutes in a hot air drying furnace maintained at 200° C. to obtain a can body having a coated seam. The concentrations of the polar groups in the coating and the density of the coating film were measured to obtain results shown in Table 2. When the MEK equilibrium swelling elasticity of the coating was measured, the value of $5.1 \times 10^6$ dyne/cm$^2$ was obtained.

EXAMPLE 11

An epoxy-phenolic paint (I) having a solid content of 27%, which comprised 70 parts of a bisphenol A type epoxy resin having an average molecular weight of 2900 and 30 parts of a resol type phenolic resin, was spray-coated on the inner surface of a welded portion of a welded can obtained in the same manner as described in Example 4 along a width of 10 mm by using an airless spray gun, so that the thickness of the coating after drying was 20 μm. The coating was baked for 3 minutes in a hot air drying furnace maintained at 200° C. to obtain a can body having a coated seam. The concentrations of the polar groups in the coating and the density of the coating film were measured to obtain results shown in Table 2. The MEK equilibrium swelling elasticity of the coating was $3.2 \times 10^6$ dyne/cm$^2$.

EXAMPLE 12

An epoxy-urea paint (II) having a solid content of 30%, which comprised 30 parts of a bisphenol A type epoxy resin having an average molecular weight of 1400 and 70 parts of a resol type phenolic resin, was spray-coated on the inner surface of a welded portion of a welded can along a width of 10 mm by using an airless spray gun, so that the thickness of the coating after drying was 15 μm. The coating was baked for 3 minutes in a hot air drying surface maintained at 200° C. to obtain a can body having a coated seam. The concentrations of the polar groups in the coating and the density of the coating film were measured to obtain results shown in Table 2. The MEK equilibrium swelling elasticity of the coating was $7.2 \times 10^7$ dyne/cm$^2$.

EXAMPLE 13

An epoxy-phenolic paint (III) having a solid content of 25%, which comprised 90 parts of a bisphenol A type epoxy resin having an average molecular weight of 3800 and 10 parts of a resol type phenolic resin, was spray-coated on the inner surface of a welded portion of a welded can obtained in the same manner as described in Example 4 along a width of 10 mm by an airless spray gun, so that the thickness of the coating after drying was 20 μm. The coating was baked for 3 minutes in a hot air drying furnace maintained at 200° C. to obtain a can body having a coated seam. The concentrations of the polar groups and the density of the coating film were measured to obtain results shown in Table 2. The MEK equilibrium swelling elasticity of the coating was $4 \times 10^4$ dyne/cm$^2$.

COMPARATIVE EXAMPLE 3

A paint having a solid content of 50%, which was obtained by dispersing polyvinyl chloride (softening point = 90° C.) in a poor solvent, was spray-coated on the inner surface of a welded portion of a welded can obtained in the same manner as described in Example 4 along a width of 10 mm by using an airless spray gun, so that the thickness of the coating after drying was 30 μm. The coating was baked for 3 minutes in a hot air drying furnace maintained at 180° C. to obtain a can body having a coated seam. The concentrations of the polar groups in the coating and the density of the coating film were measured to obtain results shown in Table 2.

COMPARATIVE EXAMPLE 4

A paint having a solid content 10%, which was formed by dissolving polyvinyl formal (degree of formalization of 60% and softening point of 160° C.) in a mixed solvent of an alcohol, a ketone, an ester and a hydrocarbon, was spray-coated on the inner surface of a welded portion of a welded can body obtained in the same manner as described in Example 4 along a width of 10 mm by using an airless spray gun, so that the thickness of the coating after drying was 20 μm. The coating was baked for 3 minutes in a hot air drying furnace maintained at 180° C. to obtain a can body having a coated seam. The concentrations of the polar groups in the coating and the density of the coating film were measured to obtain results shown in Table 2.

Welded portions were cut out from seam-coated can bodies obtained in Examples 4 through 13 and Comparative Examples 3 and 4 and the adhesion of the coating and processability were examined. These can bodies were subjected to beading, necking and flanging according to conventional methods. Tinplate lids having an epoxy-phenolic coating on each of the outer and inner surfaces and a nominal inner diameter of 211 (65.3 mm) were double-seamed to the above can bodies. The obtained empty cans were packed apple drink heated at 90° C. and tinplate lids having the same inner diameter and coating as described above were double-seamed to the packed can bodies by using a conventional seamer. The packed cans were stored at 37° C. for 1 hour. Ten cans were optionally chosen from 100 cans with respect to each sample, and the amount of iron dissolved out in the content was checked in these ten cans. Furthermore, optionally chosen 50 cans were opened and the state of the corrosion state in the seam portion of the can body was examined. The obtained results are shown in Table 2.

TABLE 2

| Example No. | Resin | carbonyl group | hydroxyl group | ether group | epoxy group | total |
|---|---|---|---|---|---|---|
| 4 | copolyester | 940 | — | — | — | 940 |
| 5 | polyamide | 510 | — | — | — | 510 |
| 6 | modified polypropylene | 80 | — | — | — | 80 |
| 7 | vinyl chloride/vinyl acetate/vinyl alcohol copolymer | 50 | 95 | — | — | 145 |
| 8 | polyvinyl butyral | 15 | 660 | 990 | — | 1665 |
| 9 | epoxy ester amino type | 100 | 270 | 630 | 15 | 1015 |
| 10 | acryl amino type | 770 | 200 | 30 | — | 1000 |
| 11 | epoxy-phenolic type (I) | — | 400 | 520 | 20 | 940 |
| 12 | epoxy-phenolic type (II) | — | 600 | 310 | 15 | 925 |
| 13 | epoxy-phenolic type (III) | — | 380 | 630 | 5 | 915 |
| Comparative Example 3 | polyvinyl chloride | — | — | — | — | ≈ 0 |
| Comparative Example 4 | polyvinyl formal | 20 | 890 | 1340 | — | 2250 |

| Example No. | Density (g/cc) | Adhesion | Processability | State of Necking-Processed Portion | Amount (ppm) of dissolved-out iron | State of Seam | Number of Perforated cans |
|---|---|---|---|---|---|---|---|
| 4 | 1.31 | 0/100 | ⓞ | no change | 4.2 | no change | 0 |
| 5 | 1.01 | 0/100 | ⓞ | no change | 4.7 | no change | 0 |
| 6 | 0.90 | 2/100 | ⓞ | slightly peeling | 6.6 | no change | 0 |
| 7 | 1.30 | 1/100 | ⓞ | no change | 5.7 | no change | 0 |
| 8 | 1.12 | 0/100 | ○ | no change | 8.3 | slight whitening | 1 |
| 9 | 1.13 | 0/100 | ○ | no change | 6.1 | no change | 0 |
| 10 | 1.15 | 0/100 | ⓞ | no change | 4.5 | no change | 0 |
| 11 | 1.21 | 0/100 | ⓞ | no change | 4.1 | no change | 0 |
| 12 | 1.25 | 0/100 | ○ | slight cracking | 6.8 | no change | 1 |
| 13 | 1.20 | 0/100 | ○ | slight cracking | 6.2 | slight spot corrosion | 0 |
| Comparative Example 3 | 1.37 | 100/100 | X | peeling and cracking | 20.0 | blister | 18 |
| Comparative Example 4 | 1.16 | 0/100 | ○ | no change | 16.2 | extreme whitening and blister | 13 |

What is claimed is:

1. A welded tinplate seam can having a side seam formed by welding, wherein the inner and outer surface portions of said side seam comprise an outermost layer formed of an oxide, which has a thickness of 50 to 400 Å, and an intermediate layer formed mainly of an iron-tin alloy layer, which has a thickness corresponding to 5 to 100% of the thickness of the total tin layer, and a resin or resin composition containing a polar group selected from the group consisting of carbonyl, hydroxyl, ether and epoxy groups at a concentration of 10 to 2000 millimoles per 100 g of the resin is coated on at least one of said inner and outer surface portions of said side seam.

2. A welded seam can as set forth in claim 1, wherein said resin is a thermosetting resin having a methylethyl ketone swelling elasticity of $1 \times 10^4$ to $1 \times 10^8$ dyne/cm$^2$.

3. A welded seam can as set forth in claim 1, wherein said resin is a thermoplastic resin having a softening point of 50° to 300° C. as measured according to the ring and ball method.

4. A welded seam can as set forth in claim 1, wherein said resin has a density of 1.10 to 1.35 g/cc.

5. A welded seam can as set forth in claim 1, wherein said resin is a composition comprising an epoxy resin and other resin at a weight ratio of from 95/5 to 1/99.

6. A welded seam can as set forth in claim 5, wherein said other resin is a hydroxyl group-containing resin or an acid- or acid anhydride-containing resin.

7. A welded seam can as set forth in claim 1, wherein the iron-tin alloy layer has an Fe/Sn atomic ratio of from 1/1 to 1/2.

8. A welded seam can as set forth in claim 1, wherein the tinplate can blank has a plated tin amount of 0.56 to 11.2 mg/m$^2$.

* * * * *